United States Patent [19]

Bütefisch

[11] Patent Number: 4,884,888
[45] Date of Patent: Dec. 5, 1989

[54] METHOD AND DEVICE FOR CONTACTLESS OPTICAL MEASUREMENT OF DISTANCE CHANGES

[75] Inventor: Karl-Aloys Bütefisch, Bovenden, Fed. Rep. of Germany

[73] Assignee: Deutsche-Forschungs- und Versuchsanstalt, Fed. Rep. of Germany

[21] Appl. No.: 860,548

[22] Filed: May 7, 1986

[30] Foreign Application Priority Data

May 11, 1985 [DE] Fed. Rep. of Germany ....... 3517044

[51] Int. Cl.$^4$ .............................................. G01B 11/14
[52] U.S. Cl. .................................... 356/373; 250/201; 356/1; 356/375
[58] Field of Search .................... 356/372, 373, 375, 4, 356/1; 250/201 AF, 201 DF

[56] References Cited

U.S. PATENT DOCUMENTS

| | | | |
|---|---|---|---|
| 3,125,624 | 3/1964 | Illis et al. | 356/381 |
| 3,347,129 | 10/1967 | Lohninser | 356/4 |
| 3,506,839 | 4/1970 | Ando et al. | 356/4 |
| 3,693,143 | 9/1972 | Kennedy | 356/1 |
| 3,768,910 | 10/1973 | Zanoni | 356/4 |

FOREIGN PATENT DOCUMENTS 61905 4/1982 Japan .................................... 356/375

Primary Examiner—F. L. Evans
Attorney, Agent, or Firm—Thomas & Kennedy

[57] ABSTRACT

A method and device for contactless optical measurement of distance changes, in which two light beams (5, 6) are directed from a measuring table (1) through an optical system (9) in such a manner that they intersect on the surface of the object (11) and in the event of distance changes, the measuring table (1) is adjusted until a scattered light maximum is produced. The light beams (5, 6) exhibit a frequency displacement relative to one another, so that the scattered light which is produced is modulated; this can readily be separated from interfering light by means of amplifiers (15) which are selective in frequency, and in this manner an accurate determination of the scattered light maximum is made possible.

10 Claims, 1 Drawing Sheet

METHOD AND DEVICE FOR CONTACTLESS OPTICAL MEASUREMENT OF DISTANCE CHANGES

BACKGROUND OF THE INVENTION

The present invention relates to a method and a device for contactless optical measurement of distance changes, in which a light beam is directed from a measuring table to an object at a defined distance and the scattered light produced on the surface of the object is directed by an optical system on the measuring table to a light sensor, and in the event of a change in the distance of the object relative to the measuring table the latter is displaced until such time as a scattered light maximum occurs on the light sensor, the distance of displacement of the measuring table corresponding to the distance change.

Devices of such a type have been known for a relatively long time, and have the advantage that the measurements are independent of the surface inclination of the object, since the scattered light is utilized for measurement purposes. However, it is a disadvantage that the scattered light maximum has a relatively weak intensity and can therefore only be evaluated with difficulty. This leads, in the final analysis, to measurement errors. Moreover, the scattered light maximum is difficult to locate, if extraneous light, more particularly scattered light of the same optical frequency, is present.

SUMMARY OF THE INVENTION

The object of the invention is to provide a method and a device by means of which measurement of distance changes are possible on an absolute basis with a relatively high degree of accuracy and independently of external interfering effects, at the same time the advantages of the known method being retained.

This is achieved according to the invention in that two light beams from the measuring table are caused to intersect by means of an optical system at a defined distance on the surface of the object. The scattered light maximum is then achieved when the point of intersection and thus the maximum intensity of the two intersecting light beams are situated precisely on the surface. If the distance of the object changes, then on the latter there is no longer a single scattering center, but two, as a result of which a scattered light maximum which is sharply defined and which can therefore easily be detected occurs.

Expediently, one of the light beams passes through an acousto-optical transducer, where it experiences a frequency displacement, and the other light beam passes through an optical path compensation arrangement, so that a modulated light signal is produced with the surface of the object is situated precisely at the point of intersection of the two light beams. The scattered light signal received by the light sensor may very easily be separated by means of amplifiers of selective frequency from the noise and thus from any extraneous light influence which may be present, the occurrence of the modulation at the same time identifying the scattered light maximum, since the modulation only takes place if the surface is situated at the point of intersection of the light beams. Accordingly, the measurements may be made very accurately, with a high degree of protection from interfering influences. On this basis, dynamic processes can also be detected, if the modulation frequency is selected to be sufficiently high, i.e. for example in the MHz range.

The two light beams are preferably generated by means of a beam splitter from a single light beam, which originates from a light source. The latter is preferably a laser.

The following of the measuring table, which serves for the determination of the distance change, may be avoided if an optical system having a variable focal length is employed; in this case, the change in focal length then represents a measure of the distance change.

The light sensor is expediently a light-sensitive diode, behind which an electronic amplifier device is connected. Advantageously, this amplifier device includes display devices, which indicate the scattered light maximum. Moreover, servo-devices can be provided, which automatically follow the measuring table or the focal length of the optical system, so that the distance change can be automatically determined and directly displayed.

BRIEF DESCRIPTION OF THE DRAWINGS

An embodiment of the device according to the invention is schematically represented in the accompanying drawing and is explained in greater detail below.

DETAILED DESCRIPTION

Figure 1:
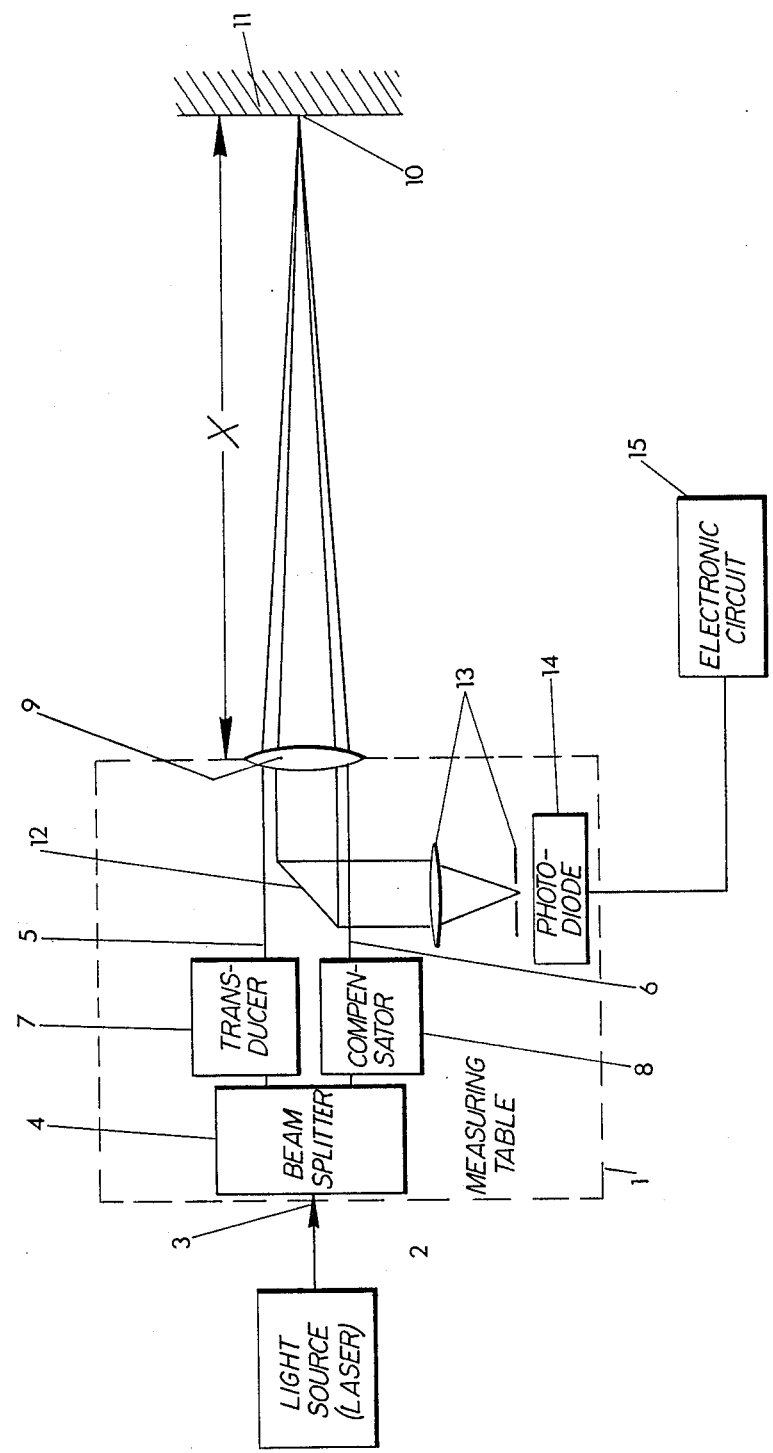

On a measuring table 1 there is provided a light source 2, which consists of a laser. The emitted light beam 3 impinges on a beam splitter 4, which is provided on the measuring table 1 and which splits the light beam 3 into two partial beams 5 and 6. In this arrangement, the partial beam 5 passes through an acousto-optical transducer 7, which generates a displacement of the frequency of the partial beam. The partial beam 6 passes through an optical path compensation arrangement 8, so that it is ensured that the two partial beams traverse the same path length. The partial beams 5 and 6 are then directed through an optical system 9, which causes the partial beams to intersect at a defined distance X. The surface of the object 11 is disposed at the point of intersection 10 of the partial beams 5 and 6, i.e. at the distance X. Accordingly, the point of intersection 10 forms the scattered light center, which is independent of the inclination or curvature of the surface. The scattered light from the scattered light center is directed through the optical system 9 via a deflecting mirror 12 to a lens diaphragm arrangement 13 and to a photodiode 14. The photodiode 14 is connected to an electronic circuit 15.

The mode of operation of the device is as follows.

The laser beam 3 is split in the beam splitter 4, into two partial beams 5 and 6, which are caused, by means of the optical system 9, to intersect at a predetermined distance X. The surface of the object is disposed at the point of intersection 10. A scattered light maximum is present on the photodiode, and this can be measured by means of the electronic system 15. Since one of the partial beams 5 exhibits a frequency displacement relative to the other partial beam 6, there is, at the point of intersection 10, a superposition in the event that the surface 11 also extends through the point of intersection. The superposition gives rise to a modulation of the scattered light, which can be detected by means of the photodiode 14 and the electronic system 15. Expediently, the electronic system can exhibit filter devices, so that an amplification of selective frequency is possible. In this connection, the particular advantage is that the measurements can no longer be influenced by noise which is generated by extraneous light. If now a change in the distance of the object 11 takes place, then the point of intersection 10 of the partial beams 5 and 6 is no longer located on the surface of the object. Instead of this, the partial beams impinge on the surface at different positions; on the one hand, this leads to a situation in which the scattered light received by the optical system 9 is of very low intensity, which is clearly measurable, and on the other hand to a situation in which a superposition of the frequencies of the two partial beams can no longer take place, which is likewise clearly measurable. In order to determine the distance change, the measuring table 1 is displaced through such a distance that the point of intersection 10 of the light beams is once again situated on the surface of the object. This is detectable with reference to the renewed appearance of the scattered light maximum on the photodiode and with reference to the likewise occurring maximum of the signal amplified on a selective frequency basis, because of the now recommencing modulation of the scattered light. In this connection, the displacement of the measuring table 1 represents a measure of the distance change.

The concept of the invention permits the most widely varying modifications. Thus, in particular the readjustment of the measuring table can take place by means of servo devices, which are not explained in greater detail and which are to be controlled by the electronic system. Furthermore, it is also possible, in place of a displacement of the measuring table, to undertake a change of the focal length of the optical system 9, which likewise represents a measure of the distance change. On the other hand, dynamic measurements can also be undertaken, in particular if the modulation frequency of the scattered light is high, i.e. in the MHz range. If, for the reception of the scattered light, a second optical system is fitted at an angle to the first optical system on the same measuring table, then greater accuracy can be achieved, since in these circumstances the volume of intersection of the two partial beams of finite thickness at the point of intersection 10 is observed from the side.

While the invention has been described and illustrated in detail herein, it should be understood that the embodiments disclosed illustrate the principle of the invention and modifications and variations of the invention can be made without departure from the spirit and scope of the invention, as set forth in the following claims:

I claim:

1. A method of contactless optical measurement of distance changes between the surface of an object and a known point comprising the steps of:
    (a) producing at least two light beams;
    (b) simultaneously directing the light beams toward a known point of intersection on the surface of an object with the object surface at least partially scattering the combined light of the intersecting superimposed beams;
    (c) detecting the occurrence of combined scattered light from the object surface; and
    (d) in the event of a distance change between the point of intersection and the object surface, adjusting the relative distance between the object surface and the point of intersection until combined scattered light is again detected so that the magnitude of the adjustment corresponds to the distance change; and
    (e) detecting the magnitude of the adjustment.

2. The method of claim 1 wherein a scattered light maximum is achieved upon intersection and superposition of the two beams on the object surface, and wherein the step of detecting the occurrence of combined scattered light comprises detecting the scattered light maximum.

3. The method of claim 1 wherein one of the light beams is displaced in frequency relative to the other beam such that upon intersection and superposition of the two beams on the object surface their combined scattered light is modulated, and wherein the step of detecting the occurrence of combined scattered light comprises detecting the scattered light modulation.

4. The method of claim 1 wherein steps (a) and (b) comprise providing an optical table which includes a light source adapted to generate the light beams, and providing an optical system designed and positioned to direct the beams toward the known point of intersection and wherein the step of adjusting the relative distance between the object surface and the point of intersection comprises displacing the optical table relative to the object surface so that the magnitude of optical table displacement corresponds to the distance change.

5. The method of claim 1 wherein steps (a) and (b) comprise providing a light source adapted to generate the light beams and providing a variable focal length optical system designed and positioned to direct the beams toward the known point of intersection and wherein the step of adjusting the relative distance between the object surface and the point of intersection comprises adjusting the focal length of the optical system so that the magnitude of the focal length adjustment corresponds to the distance change.

6. A method of contactless optical measurement of distance changes between the surface of an object and a known point comprising the steps of:
    (a) providing a light source adapted to produce two light beams with one of the beams being displaced in frequency relative to the other beam;
    (b) providing an optical system constructed and positioned to direct the two light beams toward a known point of common intersection on the surface of an object with the object surface at least partially scattering the combined light of the intersecting superimposed beams, the scattered light being modulated as a result of the frequency displacement of the beams;
    (c) detecting the occurrence of modulated scattered light from the surface as an indication that the surface is located at the point of intersection of the two beams; and
    (d) in the event of a distance change between the point of intersection and the object surface, adjusting the relative distance between the object surface and the point of intersection until the modulated scattered light is again detected, so that the magnitude of the adjustment corresponds to the distance change.

7. The method of claim 6 wherein the step of adjusting the relative distance between the object surface and the point of intersection comprises displacing the optical system relative to the object surface.

8. The method of claim 6 wherein the step of adjusting the relative distance between the object surface and the point of intersection comprises adjusting the focal length of the optical system, so that the magnitude of the focal length adjustment corresponds to the distance change.

9. An apparatus for contactless optical measurement of distance changes between the surface of an object and a known point with said apparatus comprising:
- light source means adapted to produce at least two beams of light;
- optical system means constructed and positioned to direct said light beams toward a known point of intersection on the surface of the object with the object surface at least partially scattering the combined light of the intersecting superimposed beams;
- detector means for detecting the occurrence of combined scattered light from the object surface; and
- means for adjusting the relative distance between the point of intersection and the object surface in the event of a change in position of the object surface until combined scattered light is again detected, so that the magnitude of the distance adjustment corresponds to the object surface position change;.

10. A device for contactless optical measurement of distance changes of an object comprising:
- a light source adapted to produce a beam of light;
- a beam splitter for splitting said beam of light into two partial beams;
- an optical system for directing the two partial beams toward a point of common intersection located a known distance from said optical system;
- a light sensor positioned to receive light reflected back through said optical system from the surface of an object located in the path of the two beams;
- an acousto-optical transducer positioned in the path of one of said partial beams intermediate said beam splitter and said optical system to displace the frequency of said one of said partial beams relative to the other partial beam;
- an optical path compensator positioned in the path of said other partial beam intermediate said beam splitter and said optical system to compensate for differences in travel distance of said two partial beams; and
- means for displacing the optical system relative to the object surface;
- said light sensor being adapted to detect intensity and modulation of light reflected from the surface of the object,
- whereby the light sensor detects a scattered light maximum and scattered light modulation when the object surface is positioned at the point of intersection of the two partial beams such that the partial beams are coincident and superimposed on the surface and, in the event of a distance change between the object and the intersection point, the optical system can be displaced relative to the object until the light sensor again detects a scattered light maximum and scattered light modulation, the magnitude of the optical system displacement corresponding to the distance change.

* * * * *